United States Patent

Engelsmann et al.

[11] 4,107,703
[45] Aug. 15, 1978

[54] FILM SENSITIVITY DETECTING FILTER ACTUATING CAMERA

[75] Inventors: Dieter Engelsmann, Unterhaching; Hubert Hackenberg; Andreas Schubert, both of Munich, all of Fed. Rep. of Germany

[73] Assignee: AGFA-Gevaert, A.G., Leverkusen, Fed. Rep. of Germany

[21] Appl. No.: 795,942

[22] Filed: May 11, 1977

[30] Foreign Application Priority Data

May 14, 1976 [DE] Fed. Rep. of Germany ....... 2621612

[51] Int. Cl.² .................... G03B 7/00; G03B 17/26
[52] U.S. Cl. ........................... 354/21; 354/275
[58] Field of Search ............... 354/21, 58, 275

[56] References Cited

U.S. PATENT DOCUMENTS

| | | | |
|---|---|---|---|
| 3,125,939 | 3/1964 | Bundschuh et al. | 354/21 |
| 3,368,467 | 2/1968 | Hahn | 354/21 |
| 3,491,670 | 1/1970 | Rentschler | 354/21 |
| 4,000,497 | 12/1976 | Galbraith | 354/21 |
| 4,003,062 | 1/1977 | Galbraith | 354/21 |

*Primary Examiner*—Donald A. Griffin
*Attorney, Agent, or Firm*—Michael J. Striker

[57] ABSTRACT

A camera can use film cassettes which, depending upon the sensitivity of the film they contain, are or are not provided with an external marker. If a cassette with a marker is inserted into the camera the marker deflects a sensing arm so that a projection of the arm moves out of the path of movement of a rack which carries a filter. This permits the spring-biased rack to move to a position in which the filter is located in the path of light impinging upon a light-sensing device of the camera. If a cassette without a marker is inserted the arm is not deflected and its projection extends into the path of movement of the rack and prevents the rack from moving to the aforementioned position, so that the filter cannot move into the light path.

10 Claims, 1 Drawing Figure

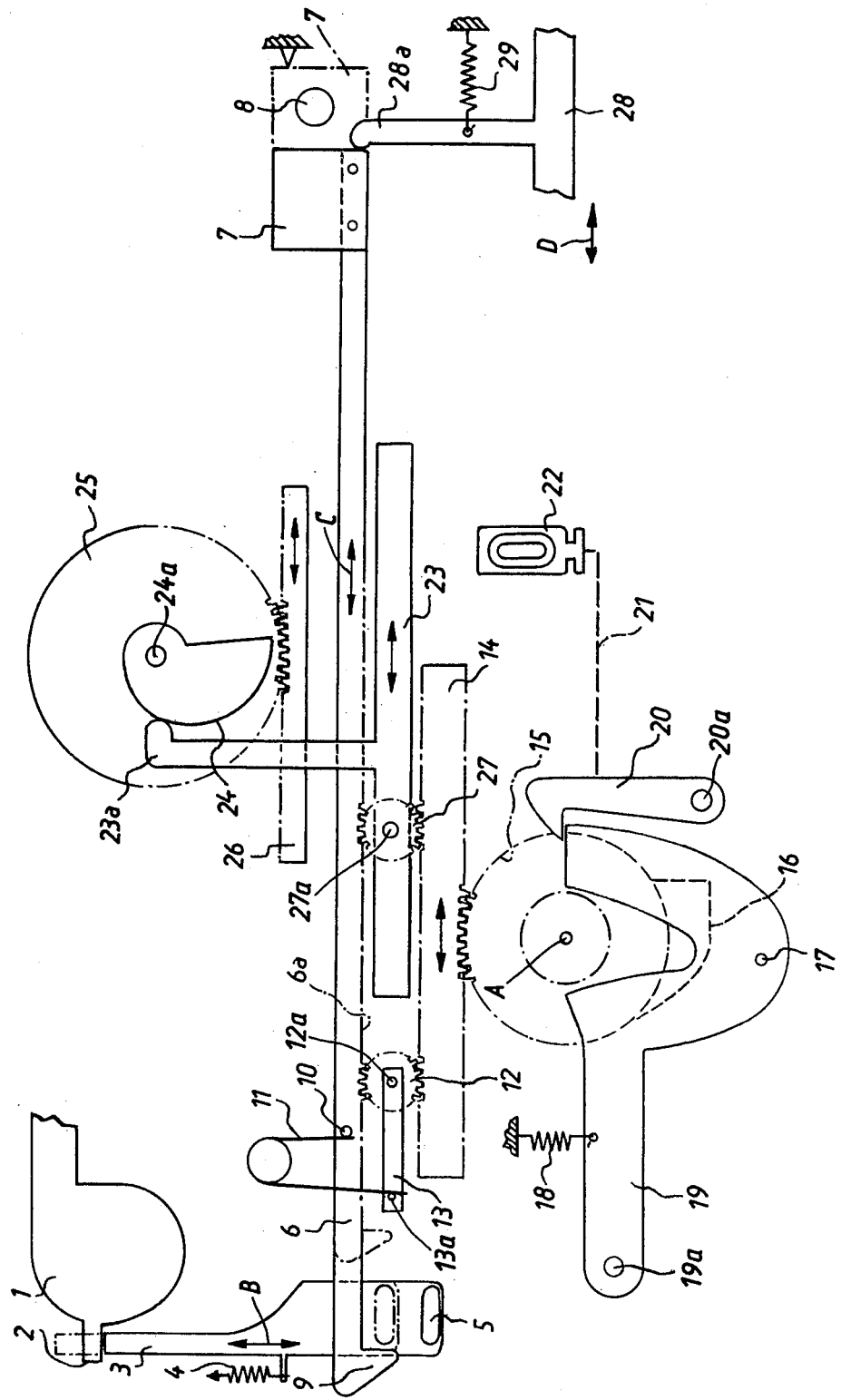

FILM SENSITIVITY DETECTING FILTER ACTUATING CAMERA

BACKGROUND OF THE INVENTION:

The present invention relates to a photographic camera, and more particularly to a photographic camera of the type using film cassettes or film cartridges.

Film cassettes or film cartridges (hereafter generically called cassettes) are available with films of different sensitivity. The conventional practice, when changing from a film having one degree of sensitivity to a film having a different degree of sensitivity, is to reset the various camera components (e.g. the lens aperture) to allow for the difference in sensitivity. However, cameras have become known in which an arrangement is provided for detecting the different film sensitivity, usually by sensing a marker provided on the cassette; in these cameras the components are automatically reset as a function of the film sensitivity detected by the detecting arrangement.

However, these prior-art cameras have certain disadvantages. The detecting arrangement is relatively complicated and hence expensive to construct; it is also subject to malfunction due to its complicated construction. Furthermore, such detecting arrangements are of a mechanical nature and transmit forces to the film cassette which tend to displace the same out of its proper position within the film chamber; this locates the film improperly with reference to the lens so that poor quality photographs may result.

SUMMARY OF THE INVENTION

It is an object of the invention to overcome the disadvantages of the prior art.

More particularly, it is an object of the invention to provide an improved camera wherein different film sensitivities can be sensed and taken into account with a simple, uncomplicated and inexpensive arrangement.

Another object is to provide such a camera wherein the cassette is not displaced out of its proper position by the operation of the film-sensitivity arrangement.

In pursuance of these objects, and of others which will become apparent hereafter, one feature of the invention resides in a camera of the type using film cassettes which are with or without external markers depending upon the sensitivity of film in the respective cassette. Briefly stated, the invention comprises a light-sensitive element, a light-diminishing component, a member carrying the component and being movable in a path between a first and a second position in which the component is respectively interposed in and withdrawn from the path of light impinging the element, means permanently urging the member towards the first position, and means for detecting the sensitivity of a film in a cassette inserted into the camera, including an arm movable in a direction transverse to the path between one position in which a portion of the arm extends into the path and blocks movement of the member to the first position, and another position in which the portion is withdrawn from the path so that the member is free to move to the first position thereof.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

The single FIGURE is a somewhat diagrammatic illustration of an exemplary embodiment of the invention.

DESCRIPTION OF A PREFERRED EMBODIMENT

The camera housing and other components not essential to an understanding of the invention have been omitted in the drawing.

A film cassette 1 is fragmentarily shown as installed in the camera; it will be understood that the camera housing is provided with a film chamber in which such a cassette will be accommodated. The cassette 1 may, e.g. be of the type 110. If the cassette 1 accommodates a higher-sensitivity film (e.g. 27 DIN), then the cassette housing will be provided with an external marker, here shown in form of a projection 2. If the cassette accommodates a lower-sensitivity film (e.g. 19 DIN), the marker 2 will be absent.

The camera has a film-sensitivity detecting arm 3 which is mounted to be movable in the direction of arrow B. Arm 3 is biased by a spring 4 which is connected to it and to a stationary camera component (e.g. the housing) and which permanently urges the arm 3 towards the marker 2. When the marker 2 is present on the inserted cassette, the arm 3 will abut it and will be moved by it (against the force of spring 4) to the solid-line position; if the marker 2 is absent from the cassette 1 the insertion of the cassette will have no influence on the arm 3 and the same will remain in the broken-line position.

A control member 6 is constructed as a rack and is mounted for movement in the direction of arrow C. At its right-hand end the member 6 carries a filter 7, e.g. a gray-filter, which moves with the member 6 and can become positioned (when member 6 moves to the right) in the path of light which impinges a light-sensitive element 8, e.g. a photoelectric resistor, so as to diminish the intensity of the light which reaches the element 8. The other end of member 6 is provided with a suitable formation, e.g. the illustrated hook or nose 9. A portion of arm 3, a projection 5 of which extends from the arm 3, moves into or out of the path of movement of nose 9, depending upon whether arm 3 is in the broken-line position or in the solid-line position.

The member 6 is part of an additive drive which comprises additional members. Thus, the drive includes an arm 13 at one end of which a gear 12 is mounted to be turnable about pivot 12a; the other end of arm 13 has a projection, such as the illustrated pin 13a. A double-leg spring 11 is provided and its legs respectively bear upon pin 13a and upon a pin 10 on member 6. The gear 12 meshes with the teeth 6a of member 6 and also with the teeth of a rack 14 which is slidable in the direction of the associated double-headed arrow; rack 14 serves to adjust the setting of a lens aperture and meshes with a toothed wheel 15 which is turnable about an axis A. Wheel 15 has a cam 16 which turns with it and which serves as an abutment for a pin 17 on a diaphragm leaf 19. The leaf 19 is pivoted at 19a and is biased in anticlockwise direction by a spring 18 which tends to move it so as to cause pin 17 to abut the cam 16. In normal (daylight) operation of the camera such pivoting of the leaf 19 is prevented by a pawl 20 which engages the leaf 19 and holds it in the illustrated position. However, the camera has a socket (not shown) in which a flash attachment (e.g. flash cube, electronic flash) can be detachably installed. This attachment is diagrammatically shown at 22; when it is placed in position on the camera it operates a mechanical linkage 21 which pivots the pawl 20 about the pivot 20a thereof in clockwise direction, thus releasing leaf 19 so that the same can pivot anti-clockwise under the action of spring 19a until pin 17 abuts cam 16. The linkage 21 is not described in detail because it is known per se.

A T-shaped member 23 is movable in the direction of the associated double-headed arrow and has mounted on it a gear 27 which turns about axis 27a and meshes with the teeth of member 6 and also with the teeth of rack 14. A portion 23a of member 23 abuts a cam face of a cam 24 which is mounted on a toothed wheel 25 with which it turns about an axis 24a. The wheel 25 serves to set the distance at which a photograph is to be made, i.e. to focus the lens (not shown). Its teeth mesh with a rack 26 which is coupled (in a manner known per se and therefore not shown) with the lens. An operating or input member 28 is slidable in the direction of arrow D and is biased to its starting position (towards the right) by a spring 29. A portion 28a of member 28 abuts the endface of member 6.

The Operation

Let it be assumed that the flash attachment 22 is not in place, that a cassette 1 has been inserted which accommodates film having a 19 DIN sensitivity rating (such a cassette lacks the marker 2), and that the member 6 is in the full-line position. When this cassette is inserted the arm 3 is in the broken-line position and remains therein because the cassette has no marker 2 to shift the arm 3 out of this position. The abutment 5 is thus located in the path of movement of nose 9. The member 28 is pushed to the left to transport the film and/or to cock the shutter mechanism (not shown); it is thereupon released and returns to its starting position under the influence of spring 29. The member 6, however, cannot follow the return movement of member 28 (to the right) because its nose 9 is engaged by projection 5. Therefore the gray-filter 7 cannot move in front of the light-sensitive element 8, i.e. it cannot reduce the intensity of light which reaches the element 8.

Conversely, if a cassette 1 is inserted into the camera which does have the marker 2 (indicative of the fact that the cassette contains a film having, e.g. a 27 DIN rating), then the marker 2 pushes the arm 3 counter to the force of spring 4 until the arm reaches the solid-line position in which its projection 5 is displaced out of the path of nose 9. In this case, when the member 28 has been operated and is retracted by spring 29 to its starting position, the member 6 follows it to the right under the urging of spring 11 until member 6 assumes the broken-line position in which the filter 7 is located in front of element 8.

To set the focus of the lens the wheel 25 is turned. This same movement is also used in order to adjust the diaphragm (i.e. the aperture). The rotation of wheel 25 is for this purpose transmitted to the wheel 15 via the members 23, 27 and 14. If it is desired to use the flash attachment 22 and the same is installed in the camera, then the insertion of the attachment 22 into its rocket operates the linkage which causes pawl 20 to pivot clockwise, releasing the diaphragm leaf for pivoting in anti-clockwise direction until pin 17 abuts the cam 16.

The advantages of the novel camera are manifold. It requires only a single arm 3 to detect film sensitivity and it uses the member 6 — which is in any case present as part of the additive drive — to cooperatively work with the arm 3. The member 6 also performs the additional functions of moving the filter 7 and controlling the operation of the aperture setting for flash operation.

Upon operation of the member 28 to transport the film and/or cock the shutter the member 6 is disengaged in a simple manner from the arm 3 and remains so as long as the projection 5 of arm 3 is not moved into the path of nose 9 (by the absence of marker 2 on cassette 1). Cassettes having films of different sensitivies can be exchanged, one for the other, irrespective of the position in which the member 28 is at the time; there is no danger that detecting errors might occur.

Since only a single element (namely arm 3) presses against the marker 2 on cassettes which are so provided, the spring force acting upon this arm can be low (and yet the arm will accurately detect the presence or absence of a marker), so that cassettes which are provided with such a marker are not forced out of their proper position by the arm.

The invention as disclosed herein by way of an exemplary embodiment is susceptible of various modifications. For example, member 6 need not be a rack, and the spring 11 need not be a double-leg spring. However, the use of a double-leg spring reacting against the elements 6 and 13 is a very simple and effective way of reducing the play between these elements (and the others of the additive drive) to a minimum, thus also assuring proper cooperation between elements 6 and 14. Since one leg of the spring 11 acts via element 13 on gear 12, this leg is required to undergo only a relatively short deflection path, an advantage which would not exist if this same leg were instead to act directly upon the element 14. Also, the spring 11 performs the additional function of biasing (and hence moving) the member 6, thus saving the need for one or more separate elements which would otherwise be required for this purpose (and which would make the construction more complicated).

While the invention has been illustrated and described as embodied in a cassette-loading camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera of the type using film cassettes which are with or without markers depending upon the sensitivity of film in the respective cassette, a combination comprising a light-sensitive element; a light-diminishing component; a member carrying said component and being movable in a path between a first and a second position in which said component is respectively interposed in and withdrawn from the path of light impinging said element; means permanently urging said member towards said first position; and means for detecting the sensitivity of a film in a cassette inserted into the camera, including an arm movable in a direction transverse to said path between one position in which a portion of said arm extends into said path and blocks movement of said member to said first position, and another position in which said portion is withdrawn from said path so that said member is free to move to said first position thereof.

2. A combination as defined in claim 1, wherein said arm is movable normal to said path.

3. A combination as defined in claim 1, wherein said portion of said arm is a projection thereof.

4. A combination as defined in claim 1; and further comprising camera-activating input means operatively associated with said member for effecting movement of the same.

5. A combination as defined in claim 1, wherein said camera comprises an additive drive for adjusting a lens aperture, said drive including said member and at least one additional movable member cooperating with the same.

6. A combination as defined in claim 5, wherein said member and said additional member have respective meshing sets of teeth.

7. A combination as defined in claim 6, wherein said member is a rack, said urging means comprising a spring reacting against both of said members.

8. A combination as defined in claim 7, wherein said spring is a double-leg spring having its legs reacting against said member and said additional member, respectively.

9. A combination as defined in claim 5, wherein said member has a set of teeth, said additional member being a turnable gear which meshes with said teeth.

10. A combination as defined in claim 9, said drive further comprising a toothed rack mounted for shifting displacement in two mutually opposite directions, and operative to adjust the lens aperture as a function of such displacement, said gear also being in meshing engagement with said toothed rack.

* * * * *